United States Patent [19]

Martens

[11] Patent Number: 4,941,042
[45] Date of Patent: Jul. 10, 1990

[54] TELEVISION TRANSMISSION SYSTEM INCLUDING A HYBRID ENCODING CIRCUIT

[75] Inventor: Jean B. O. S. Martens, Eindhoven, Netherlands

[73] Assignee: U. S. Philips Corporation, New York, N.Y.

[21] Appl. No.: 339,550

[22] Filed: Apr. 17, 1989

[30] Foreign Application Priority Data

May 3, 1988 [NL] Netherlands ................. 8801155

[51] Int. Cl.$^5$ ............... H04N 7/133; H04N 7/137
[52] U.S. Cl. ................... 358/133; 358/135; 358/136
[58] Field of Search ............. 358/133, 135, 136, 138

[56] References Cited

U.S. PATENT DOCUMENTS

| | | | |
|---|---|---|---|
| 4,704,628 | 11/1987 | Chen | 358/136 |
| 4,825,285 | 4/1989 | Speidel | 358/135 |
| 4,827,338 | 5/1989 | Gerard | 358/136 |
| 4,849,812 | 7/1989 | Borgers | 358/133 |

Primary Examiner—Howard W. Britton
Attorney, Agent, or Firm—Michael E. Marion

[57] ABSTRACT

In a television transmission system each picture is subjected to a number of picture transforms for limiting the bit rate. In each picture transform the picture is partitioned into sub-pictures of a given size. The sub-picture size is different for the different picture transforms. Each sub-picture is converted into a limited number of predetermined coefficients by use of a sub-picture transform. This number is related to the sub-picture size. With the matrix of coefficients thus obtained for each picture an approximation of the original picture is made by use of an inverse transform and this approximation is subjected to one of the said forward transforms. The matrix of coefficients now obtained is subtracted from this matrix of coefficients which is obtained by subjecting the original picture to the same forward transform.

4 Claims, 5 Drawing Sheets

TELEVISION TRANSMISSION SYSTEM INCLUDING A HYBRID ENCODING CIRCUIT

BACKGROUND OF THE INVENTION

(1) Field of the Invention

The invention generally relates to a television transmission system for transmitting television pictures in a digital format from an encoding station to a decoding station via some transmission medium.

More particularly the invention relates to a television transmission system in which generally picture coding and particularly transform coding are used to limit the bit rate.

Such a television transmission system may form part of a television broadcasting system, in which case the encoding station forms part of a broadcasting transmitter and each TV receiver is provided with a decoding station. In this case the transmission medium is the atmosphere.

Such a transmission system may also form part of a video recorder in which case the transmission medium is a videotape.

(2) Description of the Prior Art

In picture coding it is generally common practice to consider a picture as a matrix of $E_1 \times E_2$ pixels, each with a given colour. As is known, a colour is obtained by a linear combination of three so-called component signals such as Y, U, V or R, G, B. The following applies to each of the component signals separately. The value which a given component signal has for a given pixel will be referred to as pixel value. When digitizing such a picture, a number is assigned to each pixel. This may indicate the pixel value itself, or, for example the difference between the pixel values of two contiguous pixels. In the first mentioned case a digital picture as in a canonical form, shortly called a canonical picture.

In a 625-line TV picture the visible part of the picture comprises 576 lines and each line comprises 720 pixels. If the considered pixel value for each pixel is represented by 8 bits, approximately $3.10^6$ bits are required for representing the canonical picture. With 25 such pictures per second this results in a bit rate of approximately $75.10^6$ bits/sec. In practice this is found to be unacceptably high. The object of the encoding station is to convert the canonical picture into a non-canonical picture which can be represented with a considerably smaller number of bits.

Different methods are known for the said conversion, for example the above-mentioned method in which a number is assigned to each pixel indicating the difference between the pixel values of two contiguous pixels. This method is known under the name of Differential Pulse Code Modulation, abbreviated DPCM. In another method, which is known under the name of transform coding, the canonical picture is subjected to a forward transform. To this end the picture to be transformed is more particularly partitioned into sub-pictures having a size of $N_p$ pixels. Each sub-picture is subsequently converted by means of a two-dimensional transform into $N_p$ coefficients. With the aid of such a picture transform a picture is thus converted into a matrix of $E_1E_2$ coefficients. It is to be noted that the sub-pictures are usually square-shaped in practice.

A reduction of the number of bits which must be transmitted per picture is now realized by transmitting only a limited number of coefficients. This is only possible if the coefficients are uncorrelated. The transform chosen is closely related to the extent to which this object is achieved. In this connection the Karhunen-Loeve transform is found to be optimum (see for example Reference 1, pages 259–264). Nowadays Discrete Cosine Transform, abbreviated DCT is generally considered the best alternative (see Reference 1).

The total number of coefficients which is transmitted in this way for each picture forms a matrix and the number of coefficients in this matrix is referred to as the order of the picture transform.

In practice it is found that the number of coefficients qualifying for transmission may be greatly different from picture to picture. To prevent the allowed bit rate from being exceeded, the coefficients to be transmitted are quantized in a coarser manner as more coefficients are qualified for transmission. In this case the picture quality is, however, influenced detrimentally.

OBJECT AND SUMMARY OF THE INVENTION

It is an object of the invention to provide a television transmission system of the type described above in which a better picture quality is realized while using a comparable bit rate.

According to the invention the encoding station comprises means for performing a number of forward transforms on the television picture to be transmitted for generating the same number of matrixes of coefficients of fixed but mutually different order;

means for converting each one of a number of selected matrixes of coefficients into a matrix of prediction coefficients of a first higher order;

means for each time subtracting a matrix of prediction coefficients and a matrix of coefficients of the same order for generating matrixes of difference coefficients;

means for selecting difference coefficient matrixes for transmitting their difference coefficients;

and the decoding station comprises means for converting each of the transmitted difference coefficient matrixes into a matrix of at most $E_1 \times E_2$ auxiliary coefficients;

means for adding all auxiliary coefficient matrixes of a picture.

REFERENCES

1. Digital Image Processing; W. K. Pratt; John Wiley and Sons.
2. Television transmission system for transmitting basic picture weighting factors; J.B.O.S. Martens Netherlands Patent Application No. 8801154 (U.S. application No. 07/339,548, filed Apr. 17, 1989)

EXPLANATION OF THE INVENTION

GENERAL STRUCTURE OF A TELEVISION TRANSMISSION SYSTEM

Figure 1:
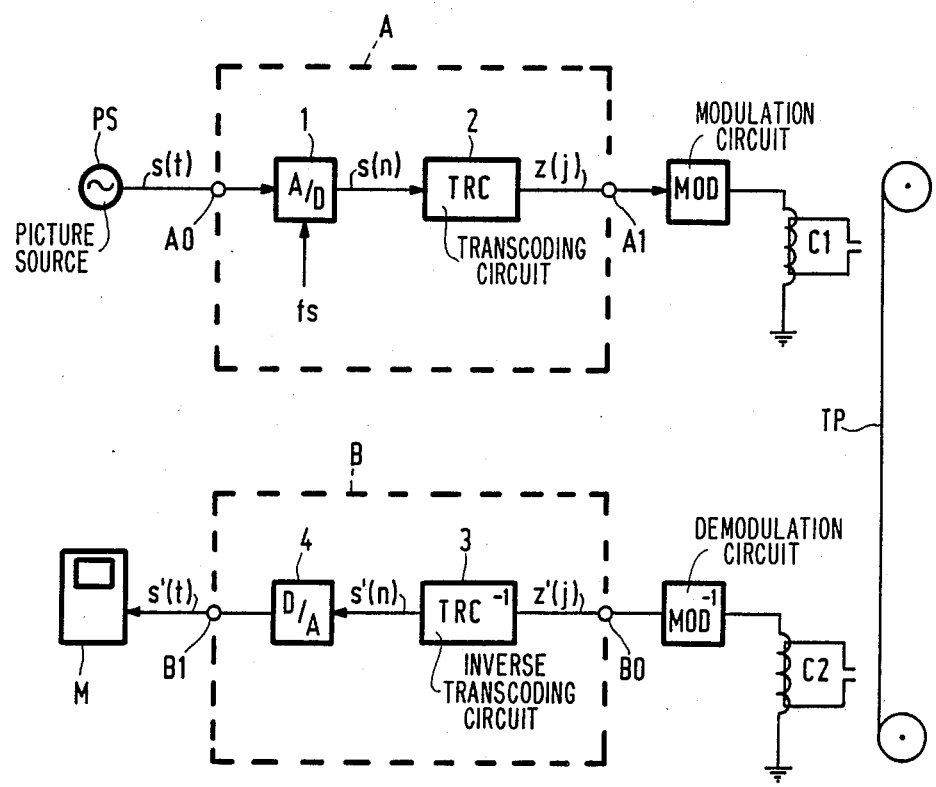
FIG. 1 shows diagrammatically a video recorder provided with the television transmission system according to the invention.

FIG. 1 shows diagrammatically a video recorder provided with the television transmission system according to the invention. This television transmission system comprises an encoding station A and a decoding station B. The encoding station A has an input A0 for receiving picture signals s(t) which are supplied by a picture signal source PS, for example a video camera. The output A1 of this encoding station is connected via a modulation circuit MOD to a write head C1 with which the processed analog picture signal s(t) can be recorded on a magnetic tape TP. To regain the original picture signal, the input B0 of the decoding station B is connected to a read head C2 via a demodulator circuit $MOD^{-1}$. This read head C2 converts the information recorded on the magnetic tape into electric signals. This decoding station B supplies from its output B1 an analog picture signal s'(t) which can be applied to a monitor M.

In the encoding station A the analog picture signal s(t) is sampled in an analog-to-digital converter 1 at a suitably chosen sampling frequency $f_s$ of, for example 13.5 MHz and the samples s(n) thus obtained, hereinafter referred to as pixel values, are coded in, for example 8-bit PCM words. These amplitude-discrete pixel values are subsequently applied to a transcoding circuit 2 supplying a bit flow z(j).

In the decoding station B the signal supplied by the read head C2 is converted in the demodulator circuit $MOD^{-1}$ into a bit flow z'(j). This bit flow is converted by an inverse transcoding circuit 3 into a series of picture signal samples s'(n). They are in their turn converted by a digital-to-analog converter into an analog picture signal s'(t) which can be displayed on the monitor M and which is a good approximation of the original signal s(t) supplied by the picture signal source PS.

The Transcoding Circuit

Figure 2:
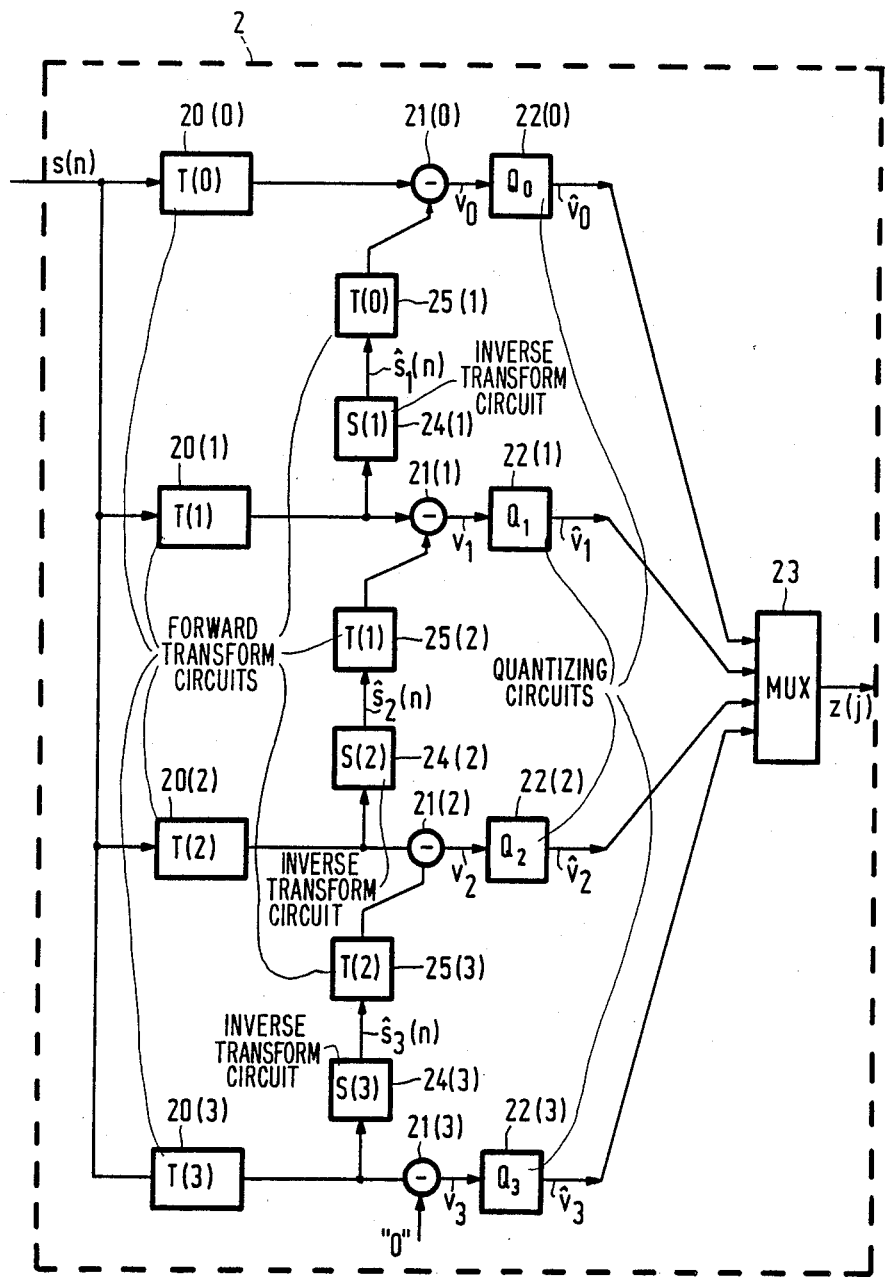
FIG. 2 shows a transcoding circuit for use in the television transmission system shown in FIG. 1.

An embodiment of the transcoding circuit 2 is shown in FIG. 2. It comprises four forward transform circuits 20(i) where i=0 to 3 each receiving the picture signal samples s(n) and each subjecting a picture to a two-dimensional transform T(i). Each forward transform circuit transforms a picture into a matrix of coefficients. As already noted, the picture in such a transform is partitioned into overlapping or non-overlapping sub-pictures of N×N pixels and each sub-picture is converted into a block of coefficients qualified for transmission to a decoding station. In each of these transform circuits it is previously determined which coefficients will be transmitted. The product of this number of coefficients and the number of sub-pictures in which the picture is partitioned is referred to as the order of transform. It is different for the different transforms T(i). This can be realized by choosing the sub-pictures for all transforms T(i) equally large and by having the number of coefficients for transmission reduced by an increasing index i of the transform T(i). However, for successive transforms T(i) sub-pictures are preferably chosen with an increasing number of pixels, for example $2^i \times 2^i$ and the number of coefficients for transmission is chosen to be such that the order of the transform T(i) decreases with an increasing value of its index i. More particularly transform circuit 20(0) will then supply the original picture; transform circuit 20(1) will supply only the d.c. coefficient, for example for each sub-picture of 2×2 pixels; transform circuit 20(2) will supply an a.c. coefficient in addition to the d.c. coefficient, for example for each sub-picture of 4×4 pixels and the same could apply to the transform circuit 20(3) in which each picture is partitioned into sub-pictures of 8×8 pixels.

The coefficients of the transform T(i) assigned for transmission are applied to a difference producer 21(i) which receives a corresponding prediction coefficent for each coefficient in the matrix. The difference coefficients which are obtained thereby and which each time form part of a difference coefficient matrix are applied to a quantizing circuit 22(i) which subjects the presented difference coefficients to a quantizing operation $Q_i$. The quantized difference coefficients $\hat{v}_i$ thus obtained are applied to a multiplex circuit 23 which supplies the bit flow z(j).

The prediction coefficients for a difference producer 21(i) are obtained by performing an inverse transform S(i+1) in an inverse transform circuit 24(i+1) on the coefficients of the forward transform T(i+1). Due to this inverse transform S(i+1) pixel values $\hat{s}_i(n)$ are obtained which are an approximation of the original picture. In a forward transform circuit 25(i+1) the picture which is represented by the pixel values $\hat{s}_i(n)$ is subjected to the forward transform T(i).

As a transform T(i) the two-dimensional Discrete Cosine Transform or any other transform can be used, but preferably the transform described in Reference 2 because this transform only calculates the desired coefficients.

Figure 3:
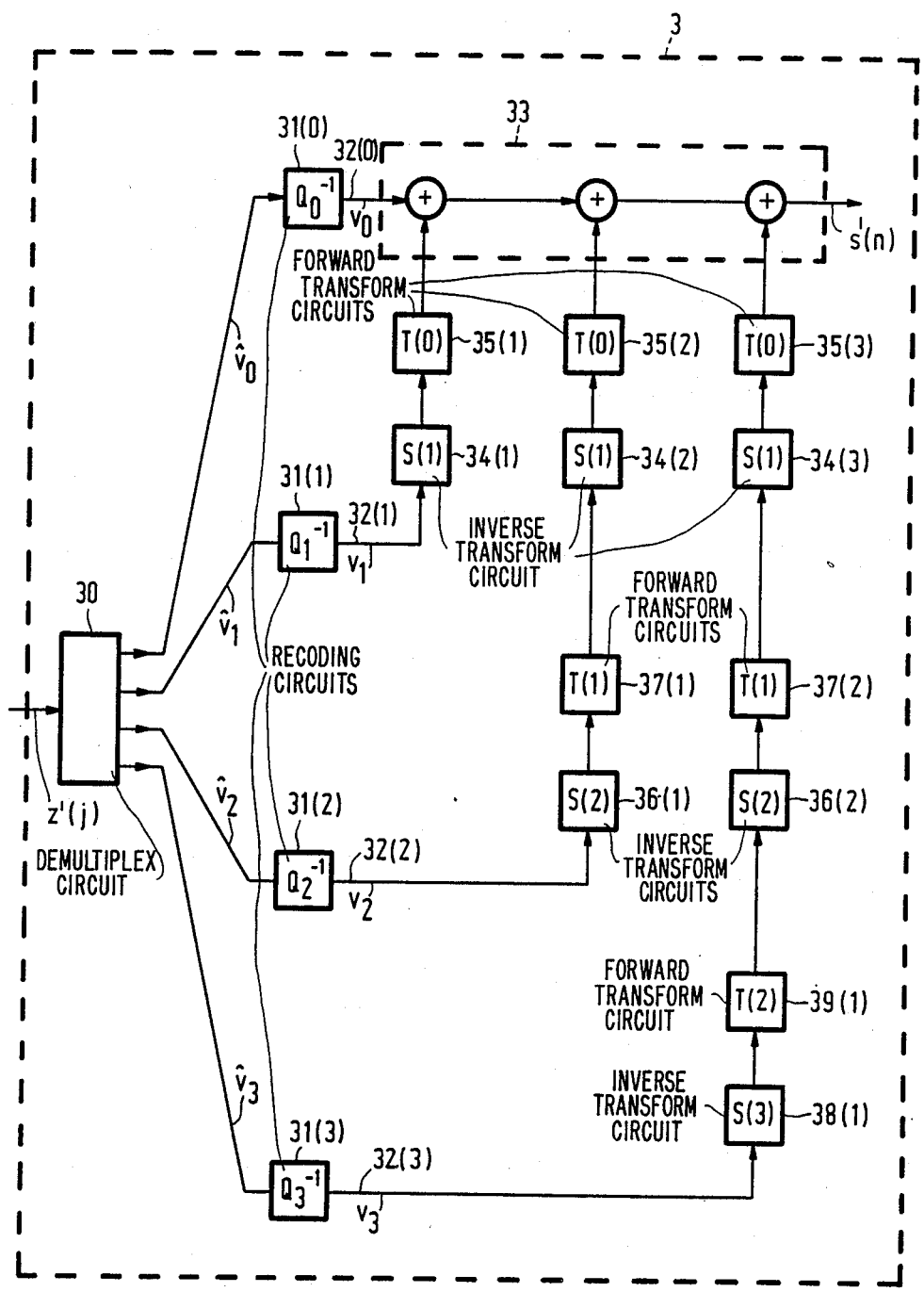
FIG. 3 shows an inverse transcoding circuit for use in the television transmission system shown in FIG. 1.

An embodiment of an inverse transcoding circuit is shown in FIG. 3. It comprises a demultiplex circuit 30 receiving the bit flow z'(j) and supplying the quantized difference coefficients $\hat{v}_i$ at its outputs. These coefficients are subjected to a recoding $Q_i^{-1}$ in a recoding circuit 31(i). This recoding is inverse to the quantization $Q_i$ which is performed by the quantizing circuit 22(i) in the encoding station. This recoding circuit 31(i) more or less supplies the original difference coefficients $v_i$ which are applied via a channel 32(i) to an input of an adder circuit 33 which consists of three summing devices in this case. Each of these circuits converts the difference coefficients $v_i$ applied thereto into a matrix of $E_1 \times E_2$ auxiliary coefficients which matrixes are added in adder circuit 32. More particularly the difference coefficients $v_0$ are directly applied to the adder circuit 33, the difference coefficients $v_1$ are applied via a cascade arrangement of an inverse transform circuit 34(1) and a forward transform circuit 35(1). The difference coefficients $v_2$ are applied to the adder circuit via a cascade arrangement of two inverse transform circuits 34(2) and 36(1) and two forward transform circuits 35(2) and 37(1). The difference coefficients $v_3$ are applied to the adder circuit 33 via a cascade arrangement of three inverse transform circuits 34(3), 36(2), 38(1) and three forward transform circuits 35(3), 37(2), 39(1). In the forward transform circuits 35(.) the same forward transform T(0) is performed as in the forward transform circuit 20(0) in transcoding circuit 2 (see FIG. 2). In a corresponding manner it holds that in the forward transform circuits 37(.) the same forward transform T(1) is performed as in the forward transform circuit 20(1). In the forward transform circuit 39(1) the same forward transform T(2) is performed as in the forward transform circuit 20(3). In the inverse transform circuit 34(.) the same inverse transform S(1) is performed as in the inverse transform circuit 24(1) (see FIG. 1). In the inverse transform circuit 36(.) the same inverse transform S(2) is performed as in the inverse transform circuit 24(2) and in the inverse transform circuit 38(1) the same inverse transform S(3) is performed as in the transform circuit 24(3).

Since T(0) represents a forward transform performed on sub-pictures of 1×1 pixels, a forward transform circuit with such a forward transform supplies the picture presented to it in an unchanged form at its output. This means that the adder circuit 33 adds a number of difference pictures, in this case four, which results in a good approximation of the original picture.

Some Alternative Embodiments

Figure 4:
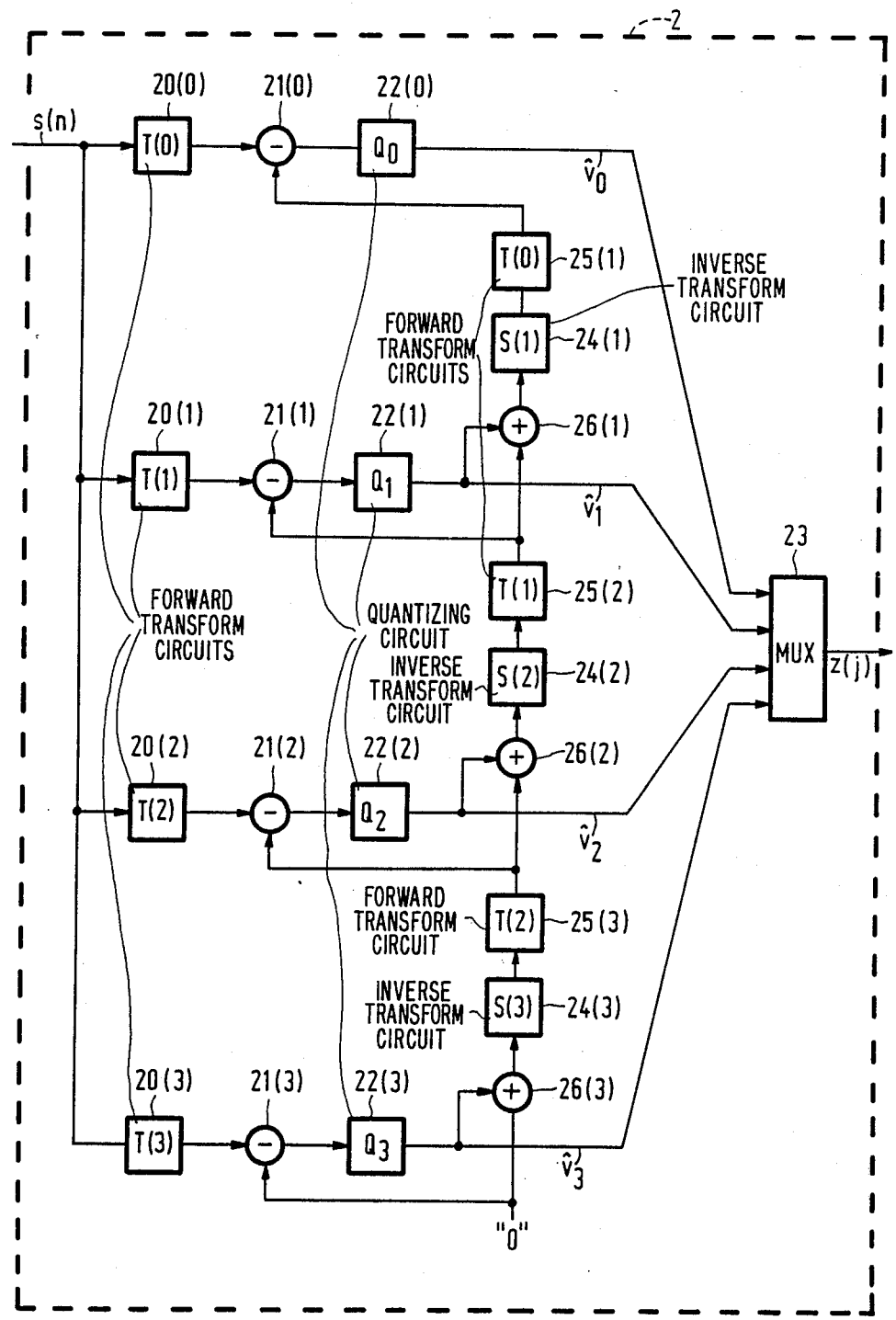
FIG. 4 shows another embodiment of a transcoding circuit.

FIG. 4 shows another embodiment of the transcoding circuit 2. It differs from that shown in FIG. 2 in that the prediction coefficients are now derived from the quantized difference coefficients. To this end summing devices 26(i) are present in this embodiment which receive the quantized difference coefficients $\hat{v}_i$ supplied by the quantizing device 22(i) and those prediction coefficients which are also applied to the difference producer 21(i).

Figure 5:
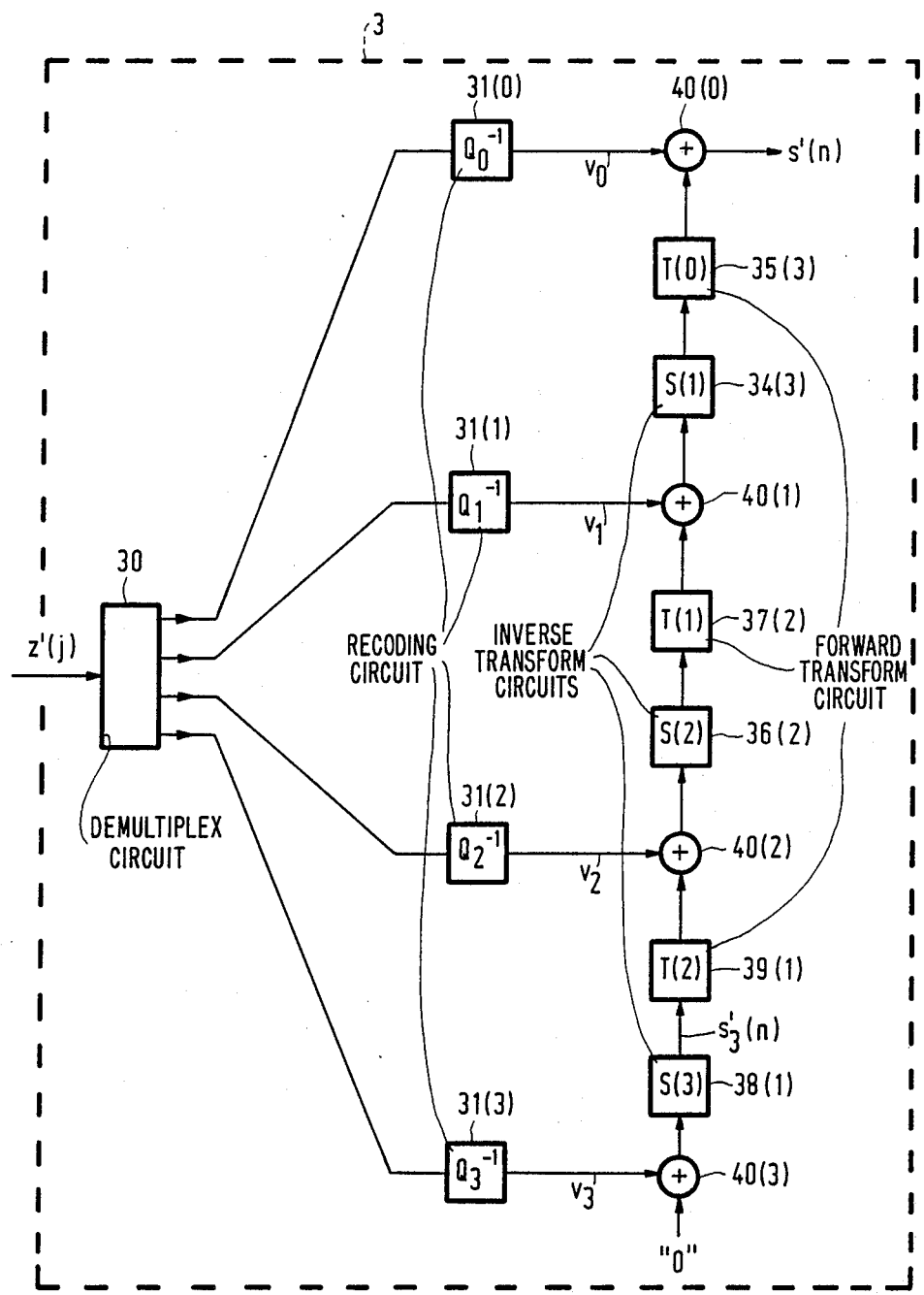
FIG. 5 shows another embodiment of an inverse transcoding circuit.

Another embodiment of the inverse transcoding circuit 3 is shown in FIG. 5. In contrast to the embodiment shown in FIG. 3 this inverse transcoding circuit only comprises one channel which has the same structure as channel 32(3) shown in FIG. 3. Furthermore the summing devices which at first jointly constituted the adder circuit 33 are distributed over this channel. More particularly a summing device 40(i) is incorporated between the output of a forward transform circuit with forward transform T(i) and the subsequent inverse transform circuit with inverse transform S(i), which summing device receives the difference coefficients $v_i$ supplied by the recoding circuit 31(i).

General Remarks

In the transcoding circuits shown in FIGS. 2 and 4 the matrixes of difference coefficients supplied by each difference producer 21(.) are transmitted to the decoding station. In practice it is found to be sufficient if only a limited number of such matrixes of difference coefficients is transmitted. Notably the matrix supplied by difference producer 21(0) will generally not have to be transmitted in practice. This matrix notably represents the difference between the original picture and a first approximation thereof.

It is to be noted that due to the specific property of the forward transform T(0) the forward transform circuits 20(0), 25(1) and 35(.) may in principle be replaced by through-connections.

In the embodiments described it has been assumed that a separate circuit is provided for performing the inverse transform S(i+1) and for performing the forward transform T(i). However, it will be evident that this is not always necessary. Under many circumstances it is found to be possible to design a circuit which directly supplies the coefficients supplied by the forward transform T(i).

It has also been assumed hereinbefore that the performed transforms are two-dimensional. However, they may also be one-dimensional, or even three-dimensional.

I claim:

1. A television transmission system for transmitting pictures comprising $E_1 \times E_2$ pixels from an encoding station to a decoding station, characterized in that the encoding station comprises:
   means for performing a number of forward picture transforms on the picture to be transmitted for generating the same number of matrixes of coefficients of a mutually different order;
   means for coverting each one of a number of selected matrixes of coefficients into a matrix of prediction coefficients of a first higher order;
   means for each time subtracting a matrix of prediction coefficients and a matrix of coefficients of the same order for generating matrixes of difference coefficients;
   means for selecting difference coefficient matrixes for transmitting their difference coefficients to the decoding station; and in that the decoding station comprises:
   means for converting each of the transmitted difference coefficient matrixes into a matrix of auxiliary coefficients comprising $E_1 \times E_2$ auxiliary coefficients; and
   means for adding all auxiliary coefficient matrixes of a picture.

2. A decoding station for use in a television transmission system as claimed in claim 1, wherein said decoding station comprises:
   means for converting each one of the transmitted matrixes of difference coefficients into a matrix of auxiliary coefficients comprising $E_1 \times E_2$ auxiliary coefficients; and
   means for adding all matrixes of auxiliary coefficients of a picture.

3. An encoding station for use in a television transmission system as claimed in claim 1 for transmitting pictures comprising $E_1 \times E_2$ pixels to a decoding station, wherein said encoding station comprises:
   means for performing a number of forward picture transforms on the picture to be transmitted for generating the same number of matrixes of coefficients of a mutually different order;
   means for converting each one of a number of selected matrixes of coefficients into a matrix of prediction coefficients of a first higher order;
   means for each time subtracting a matrix of prediction coefficients and a matrix of coefficients of the same order for generating matrixes of difference coefficients; and
   means for selecting difference coefficient matrixes for transmitting their difference coefficients to the decoding station.

4. An encoding station as claimed in claim 3, where the means for performing the forward picture transform on the picture to be transmitted are provided with means for partitioning said picture into sub-pictures having a size of $N_p$ pixels, and a sub-picture transform circuit for converting each sub-picture into predetermined fixed coefficients which are related to the size of the sub-picture, the size of the sub-pictures being different for the different picture transforms.

* * * * *